A. LOOMIS.
IRREVERSIBLE MECHANISM.
APPLICATION FILED DEC. 31, 1910.
1,158,698.
Patented Nov. 2, 1915.
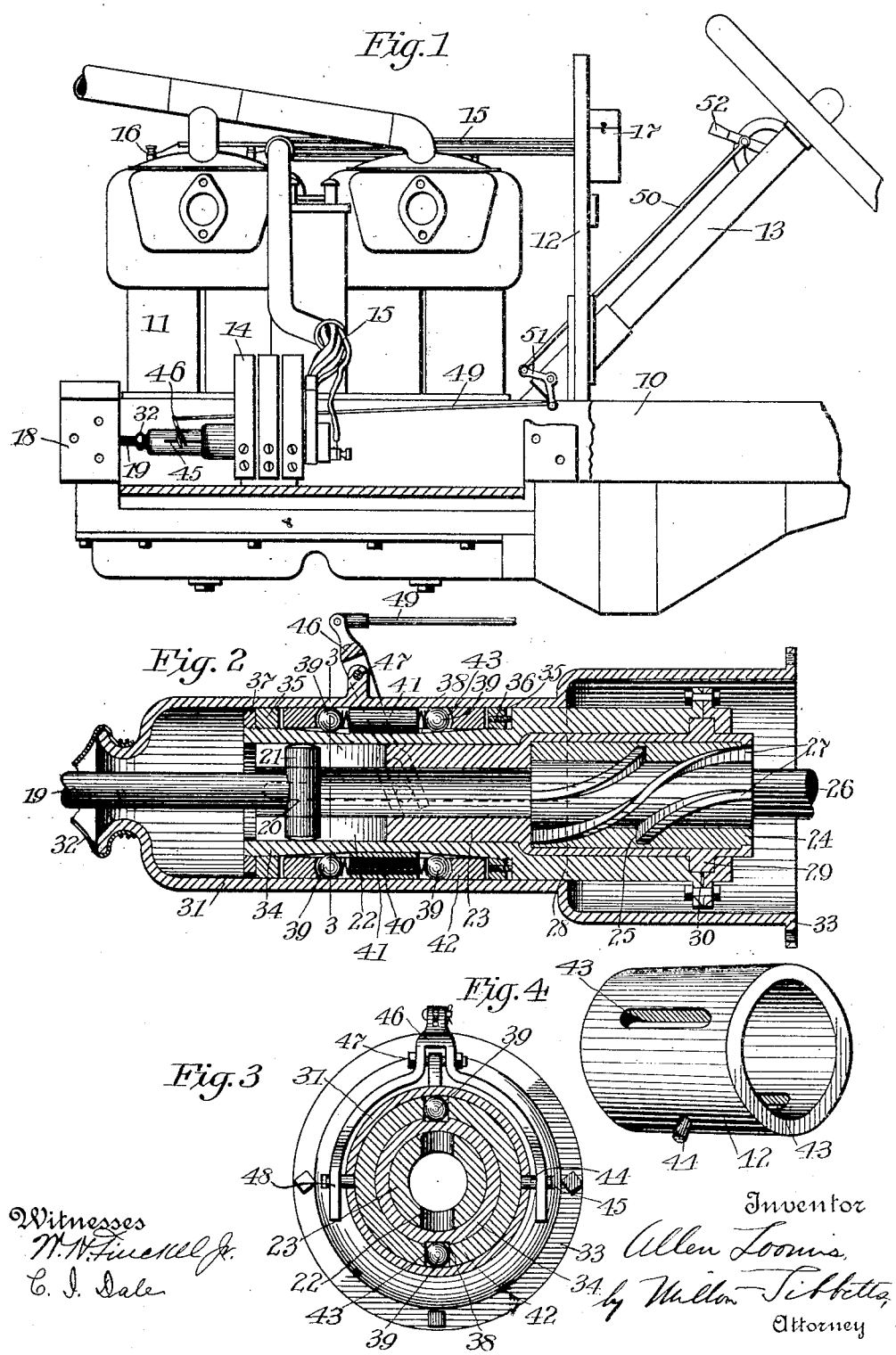

UNITED STATES PATENT OFFICE.

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

IRREVERSIBLE MECHANISM.

1,158,698.

Specification of Letters Patent.

Patented Nov. 2, 1915.

Application filed December 31, 1910. Serial No. 600,301.

*To all whom it may concern:*

Be it known that I, ALLEN LOOMIS, a citizen of the United States, and resident of Detroit, Wayne county, State of Michigan, have invented certain new and useful Improvements in Irreversible Mechanism, of which the following is a specification.

This invention relates to irreversible mechanism and more particularly to such mechanism as applied to the spark advance device of a magneto or battery ignition system of an internal combustion motor.

One form of the invention is illustrated in connection with the motor and control mechanism of a motor vehicle.

In a hydrocarbon motor employing a magneto in the ignition system it is customary to support the magneto on some part of the motor frame and connect its armature shaft with one of the motor gears through a coupling in the nature of a universal joint whereby slight disalinement of the magneto shaft and the gear shaft will be readily taken up without strain on the bearings of either shaft. The present invention has combined such a coupling with an irreversible mechanism of the type referred to in the preceding paragraph.

From the foregoing it will be seen that an object of the invention is to bring together in compact form the coupling between the magneto and its driving shaft and the spark advance mechanism of the magneto.

In magneto driving mechanism as heretofore constructed a spiral spark advance device has been used and the shifting member thereof has been operated by a lever mechanism usually extending to the steering wheel when the motor is employed on a motor vehicle, and this mechanism is usually provided with a locking device such as a pawl-and-ratchet by which the shifting member may be maintained in its adjusted position. Since this pawl-and-ratchet mechanism must, in order to be released by the operator, be arranged on the steering column or in a position within easy reach of the operator, all of the play in the various joints between the locking device and the shifting member may be taken up by the latter, and because of the irregular driving action of the magneto a constant vibration and rattle are thereby set up in the spiral advance device.

Another object of the invention, therefore, is to arrange the locking device for the spark advance mechanism at the magneto instead of at some distant point therefrom, and for this purpose a special locking and unlocking mechanism is designed.

The invention as illustrated includes a spiral spark advance device and a universal coupling connecting the magneto driving shaft and the magneto armature shaft, and the shifting member of said device is moved by a reciprocating but non-rotating sleeve which is provided with a locking mechanism which clamps the sleeve to the casing surrounding both the mechanism and the coupling. A manually controlled shifting lever is so connected with the sleeve and locking device that its initial movement unlocks the sleeve and its further movement carries the sleeve with it to the desired position of adjustment where the sleeve is again automatically locked by the locking device. Thus the thrust in either direction is taken on the casing through the locking device and none of it is conveyed through the connecting rods to the controlling lever on the motor vehicle steering post.

Referring to the drawings: Figure 1 is a side elevation of the forward end of a motor vehicle chassis showing the motor, magneto, and operating connections; Fig. 2 is a longitudinal section through the coupling and spark advance mechanism of the magneto illustrated in Fig. 1; Fig. 3 is a section on the line 3—3 of Fig. 2; and Fig. 4 is a perspective view of a detail.

The frame of the motor vehicle is shown at 10; 11 is the motor, 12 the dash, 13 the steering column, 14 the magneto, and 15 the high tension wires leading from the magneto to the spark plugs 16 and coil and switch box 17, as is well understood. A forward arm 18 of the motor forms a casing for the gears which drive the motor cam shafts and the other accessories of the motor. One of these gears is connected to the magneto driving shaft 19 and the free end of this shaft is provided with a yoke 20 having rollers 21 which are adapted to slide in ways 22 in the forward end of a coupling piece 23 thus forming a universal joint connection therewith. The other end of this coupling piece 23 is formed with a soft metal lining 24 in which are spiral grooves 25.

The armature shaft 26 of the magneto is best shown in Fig. 2 and its forward end is provided with spiral ribs 27 conforming with the spiral grooves 25 in the lining 24. It will be seen that a longitudinal movement of the piece 23, which permits the rollers 21 to slide in the ways 22, will effect an angular adjustment of the armature shaft 26 relative to the driving shaft 19. It will also be seen that the armature shaft 26 will be driven by the shaft 19 through the yoke 20, coupling piece 23 and the spiral connection referred to. Because of the spiral connection it is evident that there will be some end thrust on the coupling piece 23 and if this coupling piece were connected directly to the hand control lever this thrust would be conveyed to said lever through the various links and bell cranks, making it difficult to shift the coupling piece and necessitating a locking device for said control lever.

In the present invention the coupling piece 23 is surrounded by a non-rotating sleeve 28 by which it is shifted longitudinally through the annular flange 29 on the coupling piece and an annular groove 30 in said sleeve. The sleeve 28 is in turn surrounded by a casing 31 which extends forwardly to a point beyond the universal coupling and its forward end is provided with a dust cover 32 which fits around the driving shaft 19 whereby dust is excluded from the casing and oil may be retained therein. The casing 31 may be secured to a non-rotating part of the magneto as by the flange 33, or if preferred, it may be reversed and secured to the motor arm 18.

The forward end 34 of the sleeve 28 is somewhat smaller than the surrounding wall of the casing 31 and this end is provided with spaced abutments 35 which are adjustable to vary the space between them. These abutments may be locked in adjusted position by lock screws 36 and lock nut 37.

This end 34 is also provided with one or more longitudinal grooves 38, which grooves taper from their middle portions toward their ends, and a locking device in the form of a pair of rollers or balls 39 separated by springs 40 is located in each of these grooves. Each of the springs 40 is shown as surrounded by a small tube 41 for retaining it in position and it will be seen that this spring in acting to separate the balls 39 causes them to impinge against the inner wall of the casing 31 and cause a wedging action which resists the longitudinal movement of the sleeve 28 in either direction. This forms an effectual automatic lock for the sleeve 28 and it can only be shifted from this locked position by first relieving the balls 39 from their wedging action between the sleeve and the casing.

Means for releasing the locking device may be provided in the form of a lock releasing sleeve or ring 42 which surrounds the end 34 of the sleeve 28 between the abutments 35 and it is of such length as to have a slight movement longitudinally between said abutments. This ring is formed with a longitudinal slot 43 for each of the grooves 38 and the locking devices above referred to are adapted to be arranged in this slot as shown particularly in Figs. 2 and 3. The slot is of such length as to allow the balls 39 to obtain their full locking action and there is sufficient movement of the ring 42 between the abutments 35 to permit the ring, when moved in either direction, to release one of the locking balls 39 before said ring strikes one of said abutments. It will be understood that the continued movement of the ring after it has released the ball will carry with it the sleeve 28 and the coupling piece 23 and thereby cause an angular adjustment of the armature shaft 26 relative to the driving shaft 19.

The ring 42 may be manually shifted by means of one or more pins 44 extending radially from its sides and operating in longitudinal slots 45 in the reduced forward end of the casing 31, these pins being acted upon by a lever 46 pivoted at 47 to the casing and provided with forked ends 48 extending on both sides of said pin 44.

When adapted to a motor vehicle, the lever 46 may be connected through links 49 and 50 and bell crank 51 to a control lever 52 on the steering post 13 or some other part of the vehicle adjacent the driver's seat.

From the above description it will be seen that the initial movement of the control lever 52 from any of its various positions will, through the linkage, cause a reciprocation of the ring 42 which will release one of the locking balls 39, and a further movement of said control lever 52 will cause the ring 42, through one of the abutments 35, to carry with it the sleeve 29 and the coupling piece 23, whereby an angular adjustment of the armature shaft 26 relative to the driving shaft 19 will be made and the magneto spark will be advanced or retarded relative to the position of the motor crank shaft. As soon as the operator's hand releases the control lever 52 the locking ball 39 which was released by the ring 42 immediately assumes its normal locking position due to the action of the spring 40 and the sleeve 28 is consequently immediately locked against further reciprocating movement until the control lever 52 is again operated.

It will be seen that the sleeve 28 which shifts the coupling piece 23 may be easily adjusted through the control lever 52, but the mechanism through which this adjustment is effected is absolutely irreversible, that is, the sleeve may be moved by the control lever, but the control lever cannot be moved by any amount of thrust on the sleeve.

Having thus described my invention, what I claim is:—

1. The combination with alined driving and driven shafts, of a coupling device therebetween comprising a shiftable member arranged to vary the angular relation of said shafts, a locking device surrounding said member, and means adapted by a single operative movement to unlock and shift said shiftable member.

2. The combination with alined driving and driven shafts, of a coupling device therebetween comprising a shiftable member arranged to vary the angular relation of said shafts, a locking device surrounding said member, and means connected with both said devices adapted by a single operative movement to unlock and shift said shiftable member.

3. In a device of the class described, the combination with a rotating driving shaft and a driven shaft substantially alined therewith, of means connecting said shafts whereby one may be driven by the other, said means being movable to effect relative angular adjustment of said shafts, a shifting device for adjusting said movable means, a locking device surrounding one of said rotating shafts for holding said movable means in adjusted position, and means whereby the initial movement of said shifting device unlocks said movable means.

4. The combination with a rotating driving shaft, a driven shaft, and means connecting said shafts adapted to be moved longitudinally of one of the shafts to effect angular adjustment of the shafts, of means surrounding said connecting means for locking the latter in various adjusted positions, and operating means comprising a lost motion connection with said connecting means for unlocking and then moving the latter from one position of adjustment to another.

5. In a hydro-carbon motor, the combination with a driving shaft and a magneto, of a spark advance mechanism connecting the driving shaft with the magneto comprising a coupling member, a lever for shifting the coupling member, and means associated with the coupling member for connecting said lever and said coupling member including a checking device to prevent said coupling member from moving the lever while permitting the lever to operate the coupling member.

6. In a hydrocarbon motor, the combination with a driving shaft, a magneto, and a spark advance mechanism connecting the driving shaft with the magneto and including a universal joint, of a lever for shifting the spark advance mechanism, and means associated with the spark advance mechanism for connecting said lever and mechanism including a checking device to prevent said mechanism from moving the lever while permitting the lever to operate the mechanism.

7. The combination with a driving shaft and a magneto, a longitudinally sliding member connecting said shaft and the magneto armature shaft, a sleeve on said member for sliding the latter, means acting directly upon the sleeve for locking said sleeve in various positions of adjustment, and means for unlocking and then moving said sleeve.

8. The combination with a hydrocarbon motor including a magneto driving shaft, of a magneto mounted on the motor and having its armature shaft substantially in alinement with said driving shaft, a device connecting said shafts comprising a spiral advance mechanism and a universal joint, and a casing surrounding said device.

9. In a motor vehicle, the combination with the motor having a magneto driving shaft, a magneto, and connections from said driving shaft to said magneto comprising an irreversible shifting mechanism, of a steering column, a lever on the steering column, and connections from said lever to said irreversible mechanism.

10. In a motor vehicle, the combination with the motor having a magneto driving shaft and a magneto, a spiral thread on the armature shaft of said magneto, a connecting piece having a spiral groove coöperating with said spiral thread and being operatively connected with said driving shaft, a sleeve for shifting said connecting piece to vary the angular relation of said shafts, locking devices to retain said sleeve in adjusted position, and a shifting member adapted to unlock and then move said sleeve in either direction, of an operating lever, and connections from said lever to said shifting member whereby a shifting movement may be communicated from said lever to said connecting piece while the reverse operation is rendered impossible.

11. In a device of the class described, the combination with a rotating driving shaft and a driven shaft substantially alined therewith, a longitudinally sliding member connecting said shafts, a sleeve on said member for sliding the latter, means acting directly upon the sleeve for locking the same in various longitudinal positions, said means also tending to prevent rotation of the sleeve with the shafts, and means for unlocking and then moving said sleeve.

In testimony whereof I affix my signature in the presence of two witnesses.

ALLEN LOOMIS.

Witnesses:
G. E. GODDARD,
J. C. WOODISON.